United States Patent [19]

Goldblatt

[11] Patent Number: 5,500,512

[45] Date of Patent: Mar. 19, 1996

[54] WELDING WIRE VERIFICATION CONTROL SYSTEM

[75] Inventor: Barry Goldblatt, Danvers, Mass.

[73] Assignee: General Electric Company, Cincinnati, Ohio

[21] Appl. No.: 357,955

[22] Filed: Dec. 16, 1994

[51] Int. Cl.⁶ .................................................. G06F 17/00
[52] U.S. Cl. ................. 235/375; 228/8; 228/41; 228/102; 228/244
[58] Field of Search ................... 235/375; 228/8, 228/11, 41, 56.5, 102, 244

[56] References Cited

U.S. PATENT DOCUMENTS

| 3,744,026 | 7/1973 | Wolff | 340/146.3 |
| 3,757,090 | 9/1973 | Haefeli et al. | 235/61.11 |
| 3,990,622 | 11/1976 | Schurman, Jr. et al. | 228/41 X |
| 4,292,511 | 9/1981 | Heyman et al. | 235/454 |
| 4,493,449 | 1/1985 | Kleiman | 228/41 X |
| 5,103,081 | 4/1992 | Fisher et al. | 235/464 |
| 5,260,556 | 11/1993 | Lake et al. | 235/494 |
| 5,266,780 | 11/1993 | Kamata et al. | 235/375 |
| 5,272,318 | 12/1993 | Gorman | 235/375 |
| 5,381,487 | 1/1995 | Shamos | 235/375 X |

FOREIGN PATENT DOCUMENTS 61-253171  11/1986  Japan.

Primary Examiner—John Shepperd
Assistant Examiner—Michael G. Lee
Attorney, Agent, or Firm—Andrew C. Hess; David L. Narciso

[57] ABSTRACT

A control system for verifying propriety of welding wire for welding a part includes a spool containing the welding wire mounted to a welding machine. The spool contains an identification label which is automatically readable by a scanner positioned adjacent thereto. A controller is operatively joined to the welding machine for controlling welding start-up and a specified welding operation of the part which requires a specified welding wire. The controller is operatively joined also to the scanner for automatically reading the spool label to identify the welding wire thereon which is compared in the controller with the specified welding wire, with welding start-up of the part being prevented unless the specified welding wire matches the identified welding wire.

10 Claims, 2 Drawing Sheets

WELDING WIRE VERIFICATION CONTROL SYSTEM

The present invention relates generally to automated welding machines, and, more specifically, to control systems therefor.

BACKGROUND OF THE INVENTION

In one type of automated welding machine, a spool of welding or filler wire is operatively joined to a welding torch for providing thereto filler material used in welding of a metallic part. The torch is also operatively joined to a gas supply which provides a shielding gas for protecting the molten welding pool formed during the welding operation. Although the torch may be manually held, it is commonly supported in a carriage so that it may be automatically moved during operation, or held stationary with the part being moved past the torch, and automatically controlled by a dedicated controller of the welding machine. A typical welding machine controller may include a digital programmable microprocessor or other control system operatively joined to the various components of the welding machine for controlling the entire operation thereof including start-up.

A typical welding wire spool contains a substantial length of welding wire wound thereon which is typically used in the production of a specific part that requires a specific welding process and a specific compatible welding material. For parts requiring a different welding material and diameter of filler wire for a specified welding process, or when the spool is empty and requires replacement, the wire spool on the welding machine must be correspondingly changed to the correct spool. The wire spool is manually changed by the operator of the welding machine who must ensure that the correct wire spool is mounted in the welding machine for the specified parts to be welded. The various wire spools contain legible labels thereon identifying the welding wire and its diameter. However if an incorrect wire spool is mounted in the welding machine due to inadvertently misreading the spool label, the resulting welding operation on the parts will, of course, be inappropriate which will require suitable, and expensive, remedial action.

SUMMARY OF THE INVENTION

A control system for verifying propriety of welding wire for welding a part includes a spool containing the welding wire mounted to a welding machine. The spool contains an identification label which is automatically readable by a scanner positioned adjacent thereto. A controller is operatively joined to the welding machine for controlling welding start-up and a specified welding operation of the part which requires a specified welding wire. The controller is operatively joined also to the scanner for automatically reading the spool label to identify the welding wire thereon which is compared in the controller with the specified welding wire, with welding start-up of the part being prevented unless the specified welding wire matches the identified welding wire.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
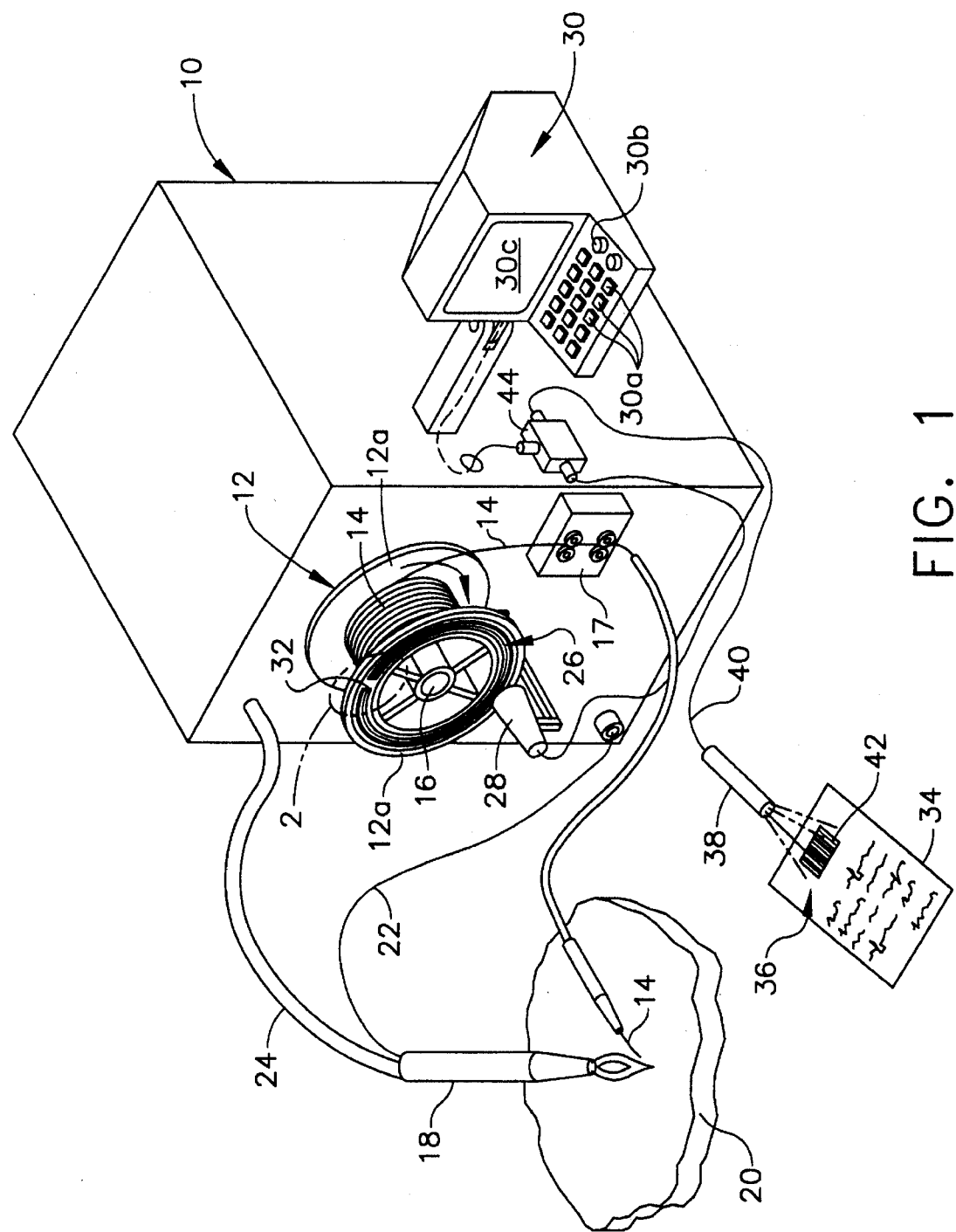
FIG. 1 is a schematic representation of a welding machine including a control system in accordance with one embodiment of the present invention for verifying propriety of a welding wire for welding a specified part.

Illustrated schematically in FIG. 1 is an exemplary automated welding machine 10 having a spool 12 containing a welding or filler wire 14 wound thereon. The welding machine 10 also includes a suitable spindle 16 which receives thereon the spool 12 for reeling out the welding wire 14 as required in the welding process using a suitable motor driven wire feeder 17. A conventional welding torch 18 receives from the spool 12 through a conduit the welding wire 14 which is automatically fed to the tip of the torch 18 for welding a specified workpiece or part 20 suitably supported adjacent thereto. Although the torch 18 may be manually moved during the welding process, it is supported in a suitable carriage (not shown) for being positioned as required during the welding process.

In the exemplary embodiment illustrated in FIG. 1, the torch 18 is conventionally electrically powered and is operatively joined to a suitable electrical power supply in the welding machine 10 by suitable electrical cables 22. The torch 18 is also operatively connected through a hose 24 to a suitable source of inert gas which provides the required inert gas shielding to the torch 18 for shielding the molten metal pool formed in the part 20 during the welding process in a conventionally known manner.

In accordance with the present invention, the welding machine 10 includes a control system for automatically verifying propriety of the welding wire 14 for welding the specified part 20. More specifically, the spool 12 includes a pair of conventional, opposite circular endcaps 12a mounted to the spool 12 by suitable spokes in this exemplary embodiment. At least one of the endcaps 12a includes a spool identification label 26 fixedly joined to the face thereof, by a suitable adhesive, for identifying the welding wire 14 contained on the spool 12. A suitable scanner 28 is positioned adjacent to the spool 12 for automatically reading the spool label 26.

Means for controlling operation of the welding machine 10 are provided in the form of a conventional digital programmable microprocessor or controller 30 which is operatively joined to the welding machine 10. The controller 30 includes suitable software for controlling all desired operations of the welding machine 10 including welding start-up and a specified welding operation of the part 20 requiring a specified welding wire. The controller 30 is also operatively joined to the scanner 28 for automatically reading the spool label 26 to identify the welding wire 14 thereon. The controller 30 is configured using suitable software therein for comparing the specified welding wire required for welding the part 20 with the identified welding wire 14 on the spool 12 and preventing welding start-up of the welding machine 10 unless the identified welding wire 14 matches the specified welding wire for the part 20. In this way, the welding wire 14 may be automatically identified by the welding machine 10 without manual operator involvement for reducing the possibility of an incorrect welding wire being used for the specified part 20.

Although the scanner 28 may be manually positioned by the welding machine operator, it is preferred that the scanner 28 be fixedly joined to the spool holder of the welding machine 10 adjacent to the spool endcap 12a containing the spool label 26 for automatically reading the spool label 26 when the spool 26 is loaded into position on the spindle 16. The scanner 28 is preferably positioned for allowing replacement of the spool 12 without disturbing or removing the scanner 28. In this way, the operator need only load a particular welding wire spool 12 into the welding machine 10, with the spool label 26 being automatically read by the scanner 28 without other involvement by the operator.

The spool label 26 may take any suitable form which allows the automatic reading or scanning thereof. In the preferred embodiment illustrated in FIG. 1, the spool label 26 includes a barcode 32 identifying the welding wire 14 on the spool 12. Correspondingly, the scanner 28 is a conventional optical or laser barcode reader.

Since the spool endcaps 12a are circular in this exemplary embodiment, it is desirable to employ a spool label 26 which may be read at any angular position of the spool 12 so that the spool label 26 may be automatically read at any position without operator involvement. In accordance with one embodiment of the present invention as shown generally in FIG. 1, the spool label 26 itself is also circular and is suitable affixed to the face of the one spool endcap 12a by a suitable adhesive.

Figure 2:
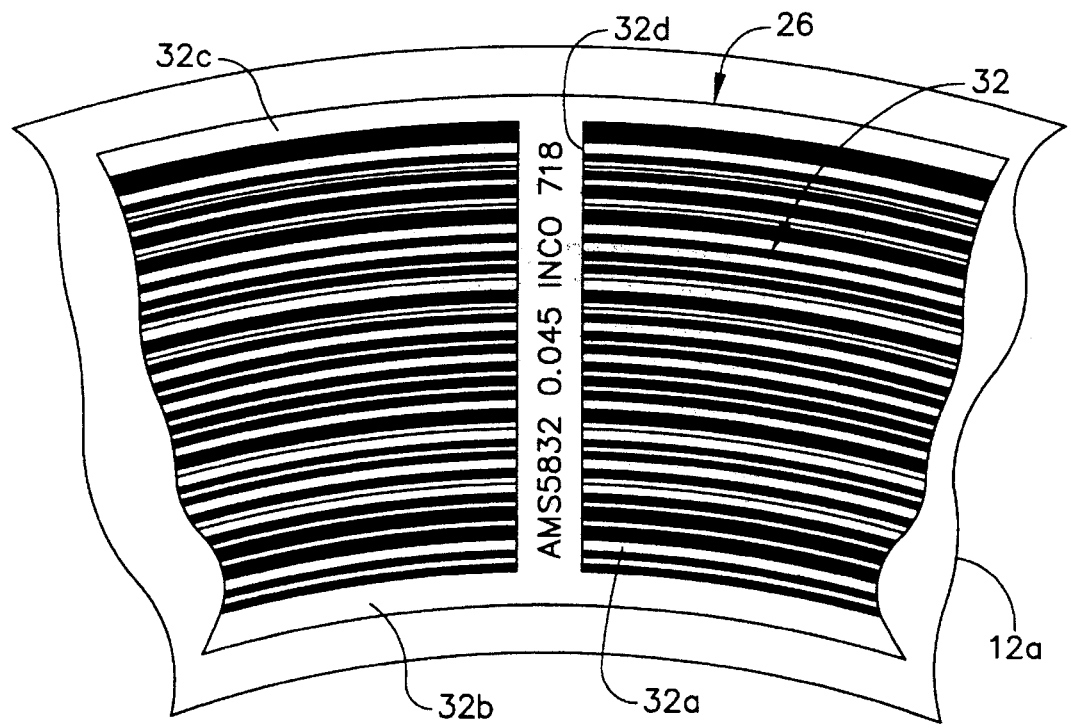
FIG. 2 is an enlarged perspective view of a portion of a spool containing the welding wire illustrated in FIG. 1 and taken within the circle labeled 2 therein.

An enlarged portion of the spool label 26 is illustrated in more particularity in FIG. 2, with the circular label 26 having a plurality of concentric barcode lines 32a arranged in an annulus with blank annular quiet zones 32b and 32c disposed radially inwardly and outwardly thereof. The barcode lines 32a are conventionally configured in appearance for correspondingly identifying the contents of the spool 12. In addition to the barcode lines 32a on the spool label 26, the label 26 preferably includes a written description of the welding wire 14 contained on the spool 12 which corresponds with the barcode lines 32a. The written description may be positioned wherever appropriate, and in the exemplary embodiment illustrated in FIG. 2, the barcode lines 32a have a single radial gap 32d which provides a clear area on which the written description may be printed. In the exemplary embodiment of the spool label 26 illustrated in FIGS. 1 and 2, the label 26 has an inner diameter of about 20 cm, an outer diameter of about 30 cm, and the blank zones 32b,c are about 5 mm across, and the gap 32d is about 6 mm. This allows the barcode lines 32a to be read at any angular orientation thereof relative to the scanner 28.

As shown in FIG. 1, the barcode 32 is preferably disposed adjacent the perimeter of the one spool endcap 12a, and the scanner 28 is positioned adjacent to the concentric barcode lines 32a for automatically reading or scanning radially thereacross in a manner similar to scanning conventional rectangular-type barcodes.

In the preferred embodiment, the spool label 26 includes an identification of the diameter and material specification of the welding wire 14 contained on the spool 12 such as 0.045 inch diameter Inco 718 wire as shown in the FIG. 2 example. The controller 30 is suitably configured for comparing both the diameter and material specification of the identified welding wire 14 on the spool 12 with the respective diameter and material specification for the specified or required welding wire for the part 20.

More specifically, associated with each part 20 to be welded is a corresponding routing or process sheet 34 as shown in FIG. 1 which identifies the part 20 and the required welding operation therefor. Associated with the required welding operation is a corresponding welding wire having a suitable material specification and diameter. Without the benefit of the present invention, the welding machine operator would use the information from the process sheet 34 to manually input into the controller 30 the specified welding operation for being automatically performed by the machine 10, with the operator being responsible for personally verifying that the correct welding wire spool 12 is mounted on the machine 10.

However, in accordance with one feature of the present invention, the operator may manually input into the welding machine 10 by pressing conventional input keys 30a on the controller 30 the identification of the part 20 and the required welding operation therefor, which includes the identification of the required welding wire. The operator ensures that the part 20 is properly loaded into the machine 10, and that the welding wire spool 12 is also loaded on the spindle 16. The operator may then simply press a selection button 30b, in response to which the controller 30 automatically causes the spool label 26 to be scanned or read for determining or identifying the welding wire 14 thereon. The controller 30 includes suitable software for automatically comparing the identified spool welding wire 14 as read from the scanner 28 with the required welding wire for the part welding operation input by the operator for enabling start-up of the welding machine 10 upon a match therebetween. If a match exists, the operator then presses a suitable start button. If a match does not exist, the welding operation will not be allowed to commence and a suitable message will be displayed on the screen 30c of the controller 30 so informing the operator.

To further automate the verification process of the welding machine 10, the process sheet 34 as illustrated in FIG. 1 may also contain its own label 36 which identifies the part 20 and the specified welding operation and welding wire therefor. A portable scanning wand 38 is operatively joined to a suitable flexible cord 40 to the controller 30 and is effective for automatically reading the process sheet label 36 when manually positioned adjacent thereto by the operator. In the exemplary embodiment illustrated, the process sheet label 36 includes a conventional, rectangular barcode 42 identifying the part 20 and the specified welding operation and specified welding wire required therefor. The barcode 42 includes straight and parallel barcode lines having a suitable, conventional appearance for providing the required identification.

Correspondingly, the wand 38 is in the form of a conventional optical or laser scanner which can automatically read the process sheet label 36 as it is swiped thereacross. In turn, the controller 30 is additionally configured with suitable software for automatically reading the process sheet label 36 via the wand 38 for determining the specified welding operation and specified welding wire for the part 20 for use in controlling the welding machine 10.

As shown in FIG. 1, a conventional dual head decoder or junction box 44 may be used for removably joining thereto both the scanner 28 and the wand 38, with the junction box 44 being operatively joined to the controller 30 for providing communication therewith. Except for the circular spool label 26, the various hardware components of the welding wire verification control system of the present invention may be conventional, commercially available, off-the-shelf components readily assembled for enjoying the improved advantages of the present invention. The spool label 26 itself includes a new, circular arrangement of otherwise conventional barcode lines 32a which allows the scanning thereof irrespective of the rotational position of the spool 12. Alternate embodiments of the spool label 26 and its cooperating scanner 28 may be used for allowing identification of the welding wire 14 on the spool 12 without the need for manual intervention by the machine operator if desired. The spool label 26 may take other forms if desired, such as electronic readable chips for example. Or, conventional optical character recognition (OCR) may be used.

Figure 3:
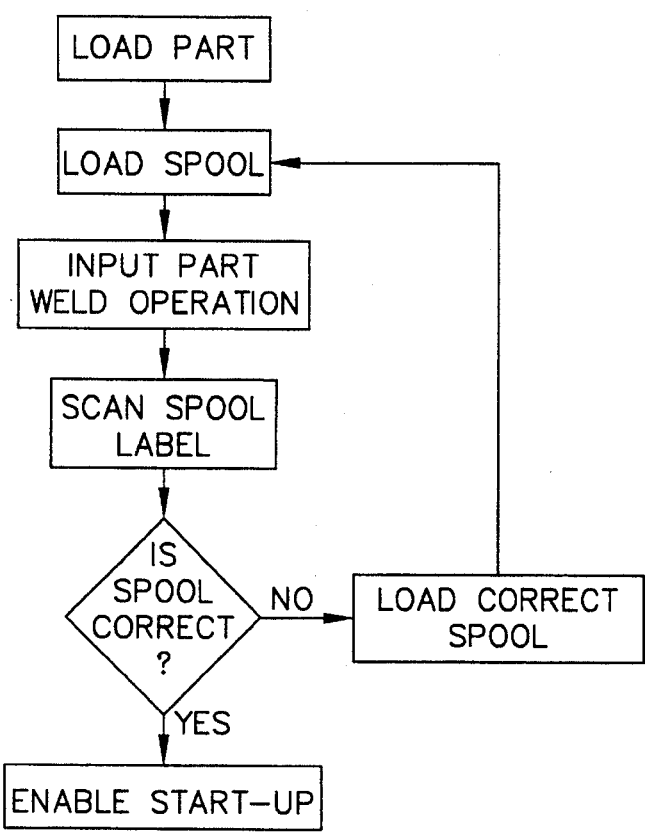
FIG. 3 is an exemplary flowchart of the verification process in accordance with one embodiment of the present invention for preventing welding machine start-up unless a match exists between the identified spool welding wire and the required welding wire for the part.

FIG. 3 illustrates a simple flowchart representation of the improved verification method in which the part 20 and the spool 12 are suitably loaded into the welding machine 10. The required weld operation for the part 20 is suitably input either manually by the operator using the control keys 30a, or more automatically by the operator scanning the process sheet label 36 using the handheld wand 38. The controller 30 in turn automatically scans the spool label 26 via the scanner 28 to determine whether the spool 26 contains the correct welding wire for the specified welding operation of the part 20. A suitable match then enables start-up of the welding process, with a mismatch preventing start-up unless suitable remedial action is taken by the operator, which may include loading the required or correct spool 12 onto the spindle 16 for the loaded part 20.

Accordingly, the weld wire verification control system described above reduces the possibility of inadvertent use of an incorrect welding wire for a given part 20.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A control system for verifying propriety of a welding wire for welding a part comprising:

a spool containing said welding wire having a pair of opposite endcaps, at least one of said endcaps having a label fixedly joined thereto identifying said welding wire contained on said spool;

a welding machine having a spindle receiving said spool, and a welding torch for receiving said welding wire from said spool;

a scanner positioned adjacent to said spool for automatically reading said spool label; and a controller operatively joined to said welding machine for controlling welding start-up and a specified welding operation of said part requiring a specified welding wire, and also operatively joined to said scanner for automatically reading said spool label to identify said welding wire thereon, said controller being configured for comparing said specified welding wire with said identified welding wire on said spool and preventing said welding start-up unless said identified welding wire matches said specified welding wire.

2. A verification control system according to claim 1 wherein said scanner is fixedly joined to said welding machine adjacent to said spool endcap containing said spool label for automatically reading said spool label when said spool is loaded in position onto said spindle.

3. A verification control system according to claim 2 wherein said spool label includes a barcode identifying said welding wire on said spool, and said scanner is an optical barcode reader.

4. A verification control system according to claim 3 wherein:

said spool endcaps are circular;

said spool label is circular and affixed to a face of said one spool endcap, with said barcode including concentric barcode lines disposed adjacent to a perimeter of said one spool endcap; and said scanner is positioned adjacent to said concentric barcode lines for automatically reading thereacross.

5. A verification control system according to claim 3 wherein said spool label includes an identification of diameter and material specification of said welding wire contained on said spool, and said controller is configured for comparing both said diameter and material specification of said identified welding wire on said spool with respective diameter and material specification for said specified welding wire.

6. A verification control system according to claim 2 further comprising:

a process sheet associated with said part and containing a label thereon identifying said part and said specified welding operation and welding wire therefor;

a portable wand operatively joined to said controller, and being effective for automatically reading said process sheet label when manually positioned adjacent thereto; and said controller being additionally configured for automatically reading said process sheet label via said wand for determining said specified welding operation and specified welding wire for said part for use in controlling said welding machine.

7. A verification control system according to claim 6 wherein:

said spool label includes a barcode identifying said welding wire on said spool, and said scanner is an optical barcode reader; and said process sheet label includes a barcode identifying said part and said specified welding operation and said specified welding wire therefor.

8. A verification control system according to claim 7 wherein said spool label is circular with concentric barcode lines thereon, and said process sheet label is rectangular with straight and parallel barcode lines thereon.

9. A method of verifying propriety of a welding wire spool mounted on an automated welding machine for welding a part comprising:

inputting to said welding machine an identification of said part and a required welding operation therefor;

automatically scanning a label on said spool for identifying said welding wire thereon; and automatically comparing said identified spool welding wire with a required welding wire for said part welding operation for enabling start-up of said welding machine upon a match therebetween.

10. A method according to claim 9 wherein said spool label includes a barcode identifying said welding wire thereon, and said label is optically scanned.

* * * * *